US012428897B2

(12) United States Patent
Eliasson et al.

(10) Patent No.: US 12,428,897 B2
(45) Date of Patent: Sep. 30, 2025

(54) SECTIONAL DOOR OPERATOR SYSTEM

(71) Applicant: Assa Abloy Entrance Systems AB, Landskrona (SE)

(72) Inventors: Daniel Eliasson, Lund (SE); Magnus Abrahamsson, Loddekopinge (SE); Johan Kjessler, Lund (SE); Anton Hansson, Kivik (SE); Dennis Melin, Ytterby (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 304 days.

(21) Appl. No.: 17/793,240

(22) PCT Filed: Feb. 4, 2021

(86) PCT No.: PCT/EP2021/052607
§ 371 (c)(1),
(2) Date: Jul. 15, 2022

(87) PCT Pub. No.: WO2021/156338
PCT Pub. Date: Aug. 12, 2021

(65) Prior Publication Data

US 2023/0184022 A1 Jun. 15, 2023

(30) Foreign Application Priority Data

Feb. 6, 2020 (SE) .................................... 2030035-6

(51) Int. Cl.
*E05F 15/70* (2015.01)
*E05F 15/668* (2015.01)

(52) U.S. Cl.
CPC ............ *E05F 15/70* (2015.01); *E05F 15/668* (2015.01); *E05Y 2201/434* (2013.01);
(Continued)

(58) Field of Classification Search
CPC .... E05F 15/70; E05F 15/668; E05Y 2400/35; E05Y 2400/36; E05Y 2400/40; E05Y 2600/46; E05Y 2201/434
See application file for complete search history.

(56) References Cited

U.S. PATENT DOCUMENTS 4,232,309 A * 11/1980 Dillitzer ................. G08B 13/08 109/21
5,402,105 A * 3/1995 Doyle .................... G08B 13/08 49/31
(Continued)

FOREIGN PATENT DOCUMENTS

CN 101806921 8/2010
EP 2243916 10/2010
(Continued)

OTHER PUBLICATIONS

International Search Report and Written Opinion in PCT/EP2021/052607 mailed Apr. 30, 2021.
(Continued)

*Primary Examiner* — Johnnie A. Shablack
(74) *Attorney, Agent, or Firm* — Wissing Miller LLP

(57) ABSTRACT

A sectional door operator system for opening and closing an opening comprises a door moved between open (O) and closed (C) positions and formed by horizontal and interconnected sections. The door is connected with a door frame with frame sections on opposite sides of the opening. A drive unit system is mounted on one of the sections that moves the sectional door from the closed position (C) to the open position (O). The drive unit system comprises first and second drive units, mounted on opposite sides of the section that each have a drive motor. A sensor device is mounted on a section and connected with a control unit. The control unit controls the drive unit system at least based on sensor data.
(Continued)

The sensor data relates to an angle (φ) of the door in relation to a true horizontal plane of the sectional door operator system.

15 Claims, 10 Drawing Sheets

(52) U.S. Cl.
CPC ....... *E05Y 2400/35* (2013.01); *E05Y 2400/36* (2013.01); *E05Y 2400/40* (2013.01); *E05Y 2600/46* (2013.01); *E05Y 2900/106* (2013.01)

(56) References Cited

U.S. PATENT DOCUMENTS

| | | | | |
|---|---|---|---|---|
| 5,894,267 | A * | 4/1999 | Blair | E06B 9/17046 340/689 |
| 6,054,921 | A * | 4/2000 | Miller | E06B 9/58 340/541 |
| 7,045,725 | B2 * | 5/2006 | Gallagher | E05F 15/48 200/61.45 R |
| 10,407,971 | B2 * | 9/2019 | Dey | G08B 13/08 |
| 11,261,648 | B2 * | 3/2022 | Axtolis | E05F 15/41 |
| 11,530,566 | B2 * | 12/2022 | Van De Wiel | E05F 15/668 |
| 11,761,250 | B2 * | 9/2023 | Balder | E05D 15/24 160/188 |
| 12,098,584 | B2 * | 9/2024 | Eliasson | E05D 15/24 |
| 2004/0187406 | A1 * | 9/2004 | Gallagher | E06B 9/88 52/173.1 |
| 2018/0305968 | A1 * | 10/2018 | Ferri | E05B 47/0005 |
| 2020/0024898 | A1 | 1/2020 | Eichstetter | |
| 2022/0049538 | A1 * | 2/2022 | Abrahamsson | E05F 15/67 |
| 2022/0243518 | A1 * | 8/2022 | Abrahamsson | E05F 15/67 |
| 2023/0044431 | A1 * | 2/2023 | Eliasson | E05F 15/67 |
| 2023/0184022 | A1 * | 6/2023 | Eliasson | E05F 15/668 49/31 |

FOREIGN PATENT DOCUMENTS

| | | |
|---|---|---|
| JP | 10088902 | 4/1998 |
| JP | 2006124989 | 5/2006 |
| WO | 2012048953 | 4/2012 |
| WO | 2019048392 | 3/2019 |
| WO | 2019048395 | 3/2019 |

OTHER PUBLICATIONS

Swedish Search Report in 2030035-6 mailed Sep. 15, 2020.
Korean Office Action for application No. 10-2022-7025680, dated Feb. 24, 2025.

* cited by examiner

SECTIONAL DOOR OPERATOR SYSTEM

This application is a 371 of PCT/EP2021/052607, filed on Feb. 4, 2021, published on Aug. 12, 2021 under publication number WO 2021/156338, which claims priority benefits from Swedish Patent Application No. 2030035-6, filed on Feb. 6, 2020, the disclosure of which is incorporated herein by reference.

TECHNOLOGY FIELD

The present invention relates to a sectional door operator system for opening and closing an opening. More specifically, the present invention relates to controlling the operation of a sectional door operator system.

BACKGROUND

Sectional door operator systems are frequently used for providing automatic opening and closing of doors to facilitate entrance and exit to buildings, rooms and other areas. The door operator systems typically comprise a number of drive units responsible for driving the sectional door between closed and open positions.

The sectional door operator systems are typically used in both private and public areas during long time periods and under various conditions in terms of time of day, time of week, time of year, passage frequencies, etc. Therefore, the systems need to remain long-term operational without malfunctions even during heavy traffic by persons or objects passing through the doors.

During operation, mechanical components of the door operator system, such as rolls, tracks or motors suffer from e.g. wear and tear or weather conditions. This may potentially result in malfunctions causing the sectional door to misalign and becoming skewed or inoperable. Conventionally, this have been solved by replacing the worn down mechanical components and by manually aligning the sectional door for further operation. The present inventors have identified problems and shortcomings in this regard.

Accordingly, an object of the present invention is to overcome, or at least mitigate one or more of these problems.

SUMMARY

An object of the present disclosure is to provide a door operator system which seeks to mitigate, alleviate, or eliminate one or more of the above-identified deficiencies in the art and disadvantages singly or in any combination.

In this disclosure, a solution to the problem outlined above is proposed. In the proposed solution, a sectional door operator system for opening and closing an opening is described.

In a first aspect of the invention, a sectional door operator system for opening and closing an opening is provided. The sectional door operator system comprises a door arranged to be moved between an open and closed position and comprising a plurality of horizontal and interconnected sections, and a door frame comprising a first frame section at a first side of the opening and a second frame section at a second side of the opening, wherein the plurality of horizontal and interconnected sections are connected to the door frame. The sectional door operator system further comprises a drive unit system mounted on a section of the plurality of horizontal and interconnected sections, wherein the drive unit system is arranged to move the sectional door from the closed position to the open position, wherein the drive unit system comprises at least a first drive unit comprising a first motor and at least a second drive unit comprising a second motor, and wherein the first drive unit and the second drive unit are mounted at different vertical sides of the horizontal and interconnected section, at least one sensor device mounted on a section of the plurality of horizontal and interconnected sections, and at least one control unit being in operative communication with the drive unit system and configured to control the operation of the drive unit system at least based on sensor data from the at least one sensor device, wherein the sensor data relates to an angle of the door in relation to a true horizontal plane of the sectional door operator system.

Benefits with the present invention comes from improving the opening/closing process of the door panel of the door operator system to reduce or eliminate irregularities in the opening and closing operation. A sectional door operator system as provided may ensure proper installation in regards to alignment and horizontal levelling, without manual work requested from the installation staff. Additionally, a technical provision of the invention includes vibration detection of mechanical components. The first aspect of the invention may prevent, alleviate or eliminate mechanical problems of various components in sectional door operator systems. Furthermore, it is less likely that the door or individual door sections become misaligned and skewed, which increases the quality and thus total lifespan of the system.

According to an embodiment of the invention, the sectional door operator system further comprises at least a first sensor device and a second sensor device, and wherein the sectional door operator system further comprises a first control unit and a second control unit, and wherein the first sensor device is configured to provide sensor data of the door to the first control unit, and the second sensor device is configured to provide sensor data of the door to the second control unit. The first control unit may be in operative communication with the first drive unit of the drive unit system, and the second control unit may be in operative communication with the second drive unit of the drive unit system.

According to one embodiment, the at least one sensor device may comprise at least one accelerometer. The at least one sensor device may be arranged at one of the plurality of horizontal and interconnected sections or at a bottom section of the plurality of horizontal and interconnected sections.

According to one embodiment of the invention, the at least one control unit is configured to control the operation of the drive unit system by evaluating said received sensor data, and based on said sensor data evaluation, control the operation of the at least first drive unit and/or the at least second drive unit. The step of controlling the operation of the at least first drive unit and/or the at least second drive unit may comprise altering the speed of the first motor and/or the second motor.

According to one embodiment, the step of evaluating said received sensor data comprises determining if there is a deviation between the sensor data of the door and a maximum sensor threshold. If there is a deviation, the speed of the first motor or the second motor is altered and else the speed of the first motor and the second motor is maintained.

According to one embodiment, the sectional door operator system further comprises at least one first and second sensing element configured to provide operational data of the first and second motor to the at least one control unit, wherein operational data comprises information related to the position of the first and/or second motor. The first and second sensing elements may be position sensors and/or encoders, and the first sensing element may be arranged in conjunction with the first drive unit and may be configured to provide operational data of the first drive unit to the at least one control unit, and the second sensing element may be arranged in conjunction with the second drive unit and may be configured to provide operational data of the second drive unit to the at least one control unit.

According to one embodiment, the at least one control unit is further configured to control the operation of the drive unit system by receiving operational data relating to the first drive unit or to the second drive unit, evaluating said received operational data, and combining said operational data evaluation with said sensor data evaluation, and based on said combined evaluation, control the operation of the first drive unit and/or the second drive unit.

According to one embodiment, wherein if it is determined that there is a deviation in position between the first motor and the second motor, the at least one control unit is further configured to determine which of the motors that are the furthest away from a target position, and wherein if the second motor is determined to be further away from a target position than the first motor, the speed of the first motor will be reduced and if the first motor is determined to be further away from a target position than the second motor, the speed of the second motor will be reduced.

According to one embodiment, the at least one control unit is further configured to determine if the position of the respective motors is equal to a target position, and if so the at least one control unit is configured to stop the operation of both the first and the second motor.

According to one embodiment of the invention, the drive unit system further comprises a third and a fourth drive unit mounted on another section of the plurality of sections than the first and second drive unit, wherein the third and a fourth drive unit are arranged to assist the first and second drive units when moving the door from the closed position to the open position, and wherein the third and fourth drive unit are connected to the at least one control unit, and wherein the sectional door operator system further comprises at least a third sensor device being arranged at the same section as the third and a fourth drive unit and wherein the at least one control unit is further configured to receive sensor data from the at least third sensor device.

In a second aspect of the invention, a control unit in a sectional door operator system being in operative communication with a drive unit system comprising at least a first drive unit comprising a first motor and at least a second drive unit comprising a second motor is provided. The control unit is configured to control the operation of the drive unit system at least based on sensor data from at least one sensor device, wherein the sensor data relates to an angle of a door in relation to a true horizontal plane of the sectional door operator system.

In a third aspect of the invention, a method of controlling the operation of at least a first drive unit and at least a second drive unit of a drive unit system in a sectional door operator system is provided. The method involves providing at least one sensor device and at least one control unit being in operative communication with the drive unit system and configured to control the operation of the drive unit system at least based on sensor data from the at least one sensor device, wherein the sensor data relates to an angle of the door in relation to a true horizontal plane of the sectional door operator system.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF THE EMBODIMENTS

Figure 1:
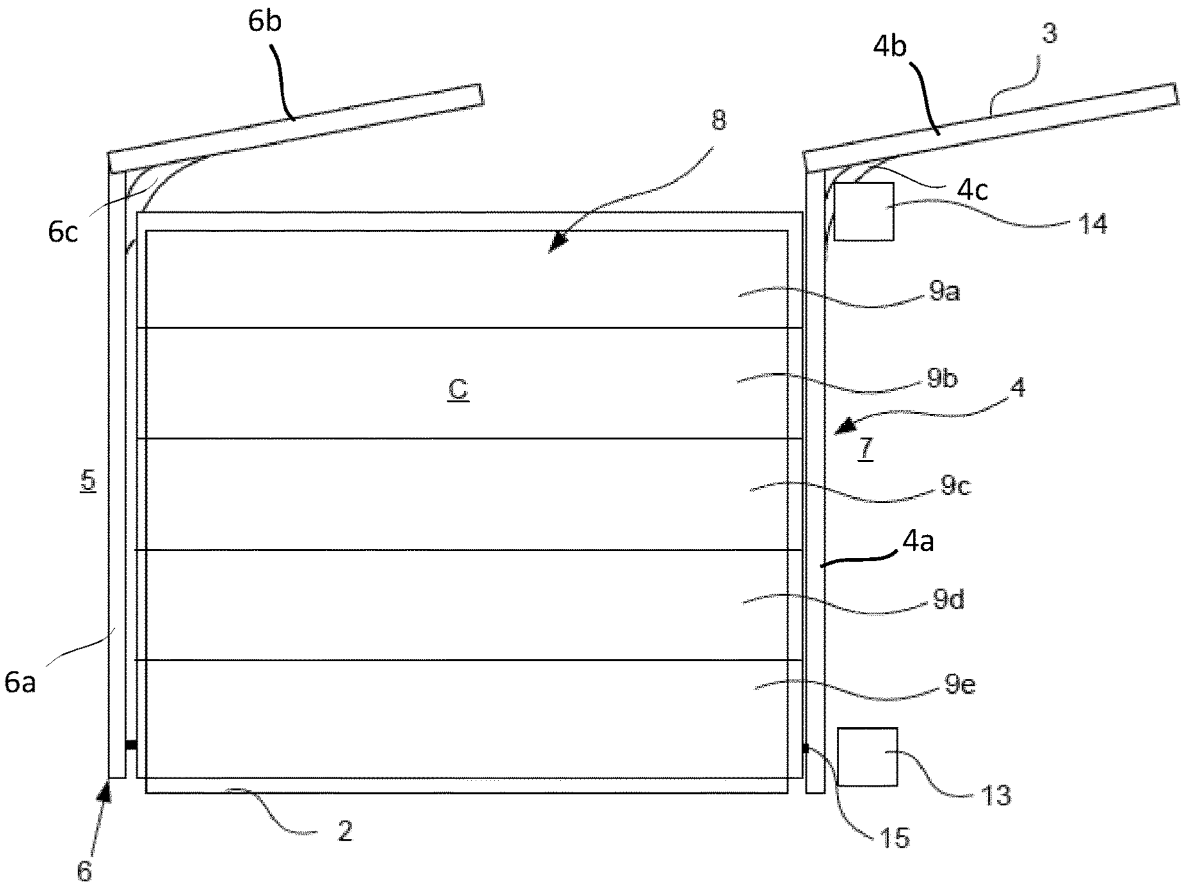
FIG. 1 is a schematic perspective view of a door operator system comprising a sectional door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
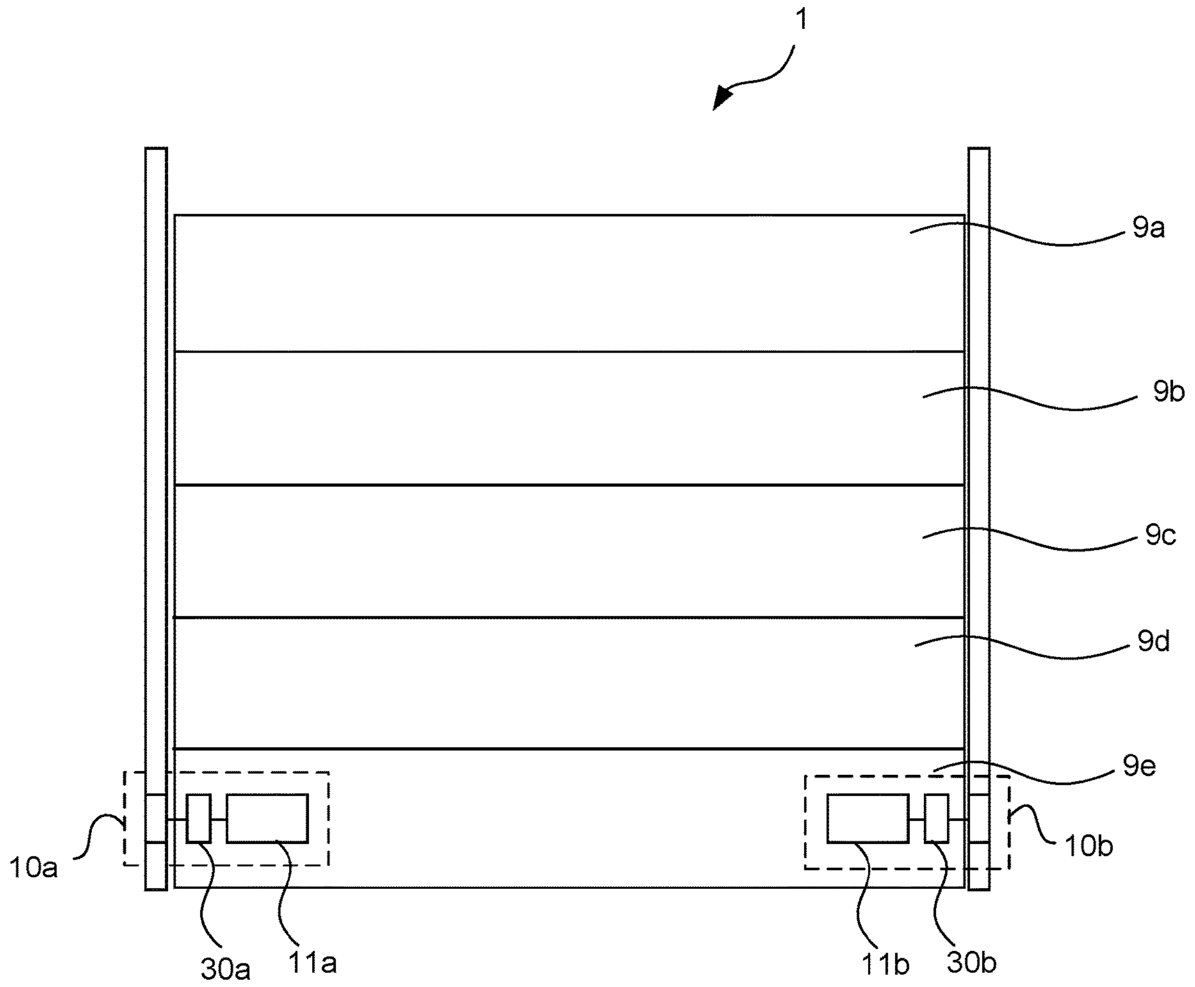
FIG. 2 is a schematic perspective view of a door operator system comprising a sectional door in a closed position.

FIGS. 1-3 illustrate different embodiments of a sectional door operator system 1. However, as should be understood by a person skilled in the art, the inventive aspects of the present invention are also applicable to a door operator system that is a single blade door operator system.

Figure 3A:
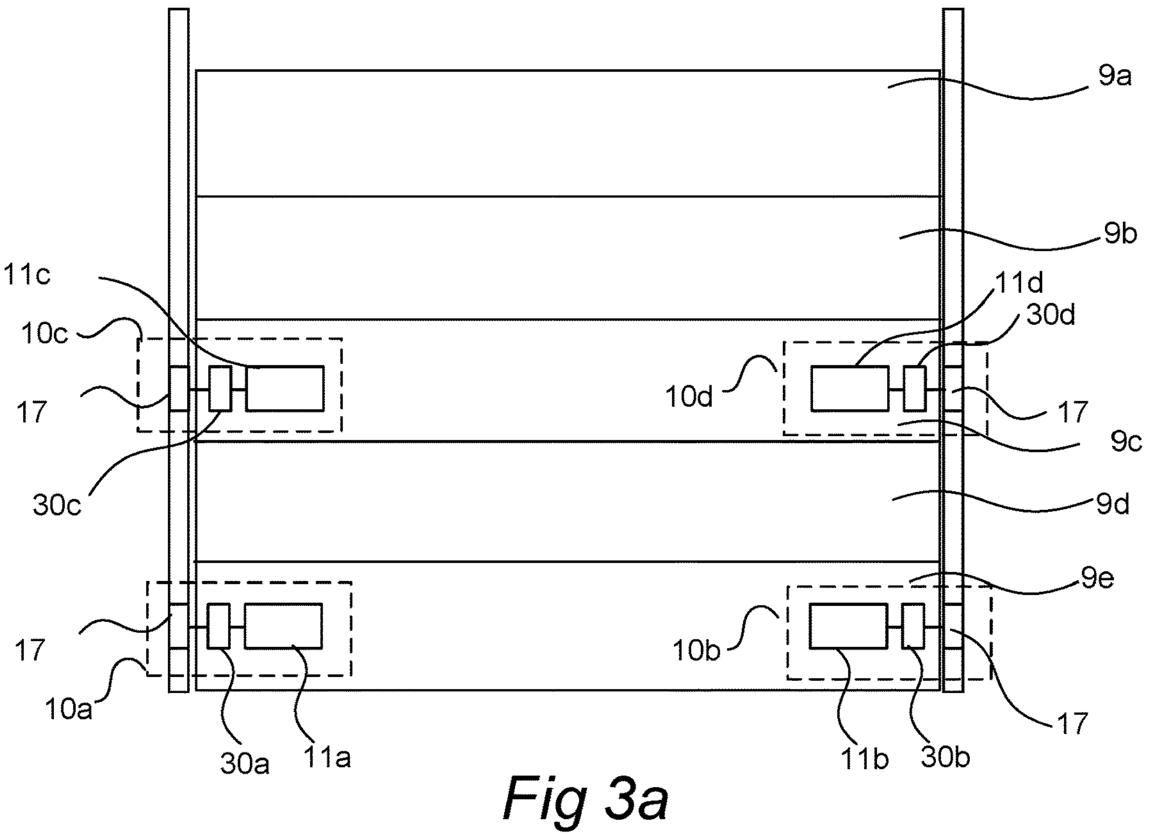
FIGS. 3*a*-3*b* are schematic perspective views of different door operator systems comprising a sectional door in a closed position.
Figure 3B:
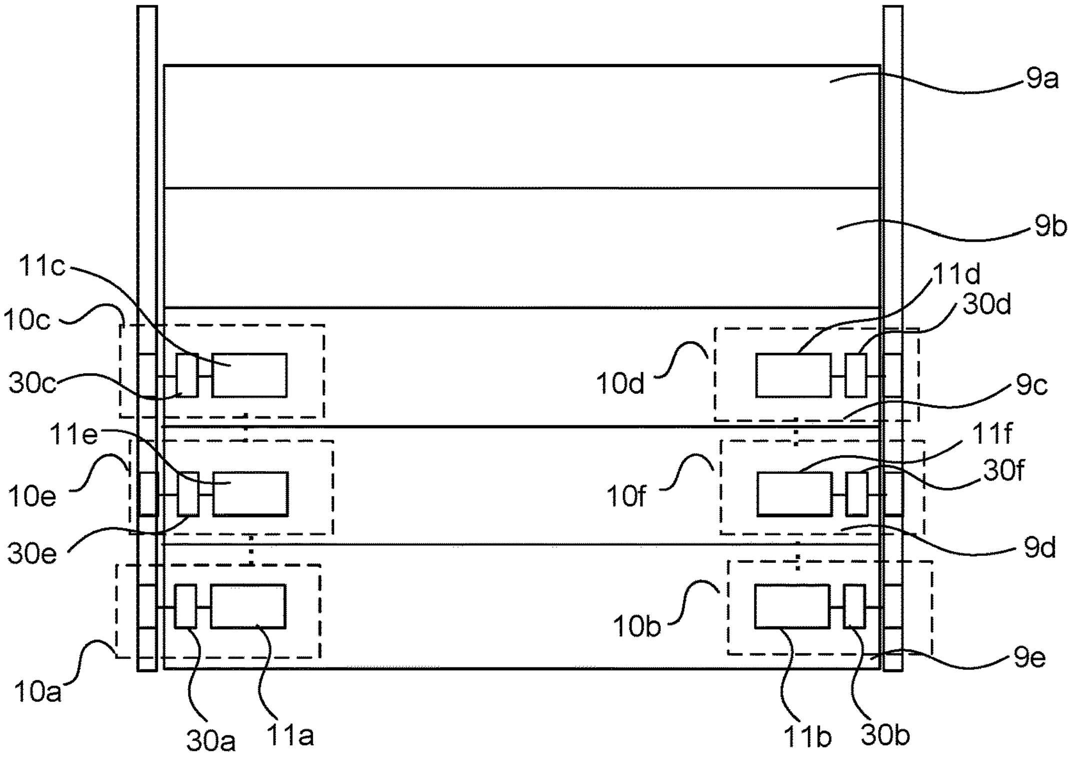

FIGS. 1-3 are schematic views of different embodiments of a door operator system 1 in which the inventive aspects of the present invention may be applied. The door operator system 1 comprises a door frame 3, a door 8 and a drive unit system 100. In a preferred embodiment of the invention as illustrated by FIGS. 1-2, the drive unit system 100 comprises a first drive unit 10*a* and a second drive unit 10*b*. In an alternative embodiment, shown in FIG. 3*a*, the drive unit system 100 comprises a third and a fourth drive unit 10*c-d*. The third drive unit 10*c* comprises a third motor 11*c*, and the fourth drive unit comprises a fourth motor 10*d*. Furthermore, as seen in FIG. 3*a*, the third drive unit 10*c* further comprises a third sensing element 30*c*, and the fourth drive unit 10*d* further comprises a fourth sensing element 30*d*. In further alternative embodiments, shown in FIG. 3*b*, the drive unit system 100 may comprise an arbitrary number of drive units 10*a-f*, wherein each drive unit 10*a-f* comprises a motor 10*a-f* and a sensing element 30*a-f*. In all embodiments, the drive units 10*a-f* are preferably separate units operating independently of each other.

The door operator system 1 is arranged to be installed in an opening 2 defined by a wall 50 and a floor 23. The door operator system 1 is arranged to open and close the opening 2 by moving the door 8 between an open position O and a closed position C, as disclosed in FIG. 1.

In this embodiment, the door 8 is a sectional door 8 comprising a plurality of horizontal and interconnected sections 9*a-e* connected to the door frame 3. In one embodiment, the door is a garage door. In an alternative embodiment, the door is an industrial door. The door 8 is arranged to be moved along the door frame 3 between the closed position C and the open position O.

In one embodiment, the door operator system 1 is an up and over door operator system. An up and over door operator system is a system in which the door in the closed position C is arranged substantially vertical and in the open position O is arranged substantially horizontal and inside of the opening.

In an alternative embodiment, the door operator system 1 is an up and up door operator system. An up and up door operator system is a system in which the door in the closed position C is arranged substantially vertical and in the open position O is arranged substantially vertical above the opening.

The door frame 3 comprises a first frame section 4 at a first side 7 of the opening 2 and a second frame section 6 at a second side 5 of the opening 2. The door frame 3 is connected to the wall 50 and to the floor 23. The first frame section 4 comprises a substantially vertical part 4*a* and a substantially horizontal part 4*b*. The second frame section 6 comprises a substantially vertical part 6*a* and a substantially horizontal part 6*b*. The vertical part 4*a*, 6*a* and the horizontal part 4*b*, 6*b* are connected to create a path for the door 8 to glide on and a track for the drive units 10*a-b* to interact with.

The door 8 is directly or indirectly connected to the door frame 3. The door 8 is at a first side moveably connected to the first frame section 4 and at a second side moveably connected to the second frame section 6. In one embodiment, one or more of the plurality of sections 9*a-e* is connected to the first frame section 4 at said first side 7 and to the second frame section 6 at said second side 5.

The first drive unit 10*a* comprises a first motor 11*a*, and the second drive unit 10*b* comprises a second motor 11*b*. The drive units 10*a-b* may further comprise at least one battery. The at least one battery is arranged to power the respective motor 11*a-b* of the drive unit 10*a-b*. In one embodiment, the at least two motors 11*a-b* are connected to one battery. In an alternative embodiment, one or more batteries are connected to each motor 11*a-b*. In yet one embodiment, the first motor 11*a* is connected to a first battery and the second motor 11*b* is connected to a second battery.

The drive units 10*a-b* are connected and/or mounted to the door 8. In one embodiment, as will be described more in relation to FIG. 2, the drive units 10*a-b* are mounted to a section 9*e*, i.e. one of said plurality of horizontal and interconnected sections, of the door 8. The first motor 11*a* and the second motor 11*b* are arranged on the same section 9*e*. Preferably, the first motor 11*a* and the second motor 11*b* are arranged at different vertical sides of the section 9*e*. Each motor 11*a-b* is thus arranged in conjunction to the first frame section 4 and the second frame section 6, respectively.

The drive units 10*a-b* are further connected to the door frame 3. The drive units 10*a-b* are at a first side moveably connected to the first frame section 4 and at a second side moveably connected to the second frame section 6. Hence, the first motor 11*a* is moveably connected to the first frame section 4 and the second motor 11*b* is moveably connected to the second frame section 6. The drive units 10*a-b* are arranged to interact with the door frame 3 to move the sectional door 8 from the closed position C to the open position O and from the open position O to the closed position C.

In one embodiment, at least one motor 11*a-b* of the first and second drive units 10*a-b* is configured to brake the movement of the sectional door 8 when the sectional door 8 is moved from the open position O to the closed position C. In one embodiment, both the first and second motor 11*a-b* are configured to brake the movement of the sectional door 8 when the sectional door 8 is moved from the open position O to the closed position C.

In one embodiment the door operator system 1 further comprises, as an optional feature, at least one charging unit 13, 14. In one embodiment, as disclosed in FIG. 1, the door operator system 1 comprises a first charging unit 13 and a second charging unit 14. The charging units 13, 14 are preferably connected to the door frame 3. The first charging unit 13 is mounted in a position that correlates with the position of the battery of the respective drive unit 10*a-b* when the sectional door 8 is in the closed position C. The first charging unit 13 is arranged to be connected to and to charge the at least one battery in the closed position. The second charging unit 14 is mounted in a position that correlates with the position of the battery of the drive unit system 100 when the sectional door 8 is in the open position C. The first charging unit 14 is arranged to be connected to and to charge the at least one battery in the open position. In one embodiment, charging may be provided continuously to the battery by means of an electric cable connecting the battery to a power source.

In one embodiment, at least one motor 11*a-b* of the respective drive unit 10*a-b* is configured to act as a generator and to charge the at least one battery when the sectional door 8 is moved from the open position O to the closed position C. In one embodiment, both the first and second motor 11*a-b* of the drive units 10*a-b* are configured to act as a generator and to charge the at least one battery when the sectional door 8 is moved from the open position O to the closed position C.

In one embodiment, the at least first and second motor 11*a-b* of the drive units 10*a-b* are direct current DC motors.

In a preferred embodiment, the at least first and second motor 11*a-b* are brushless direct current (BLDC) motors.

In one embodiment, at least one motor 11*a-b* of the drive units 10*a-b* further comprise a brake (not shown). In one embodiment, both the first and the second motor comprises the brake. In one embodiment, the brake is an electromagnetic brake. The brake may be arranged to control/reduce the speed of the door 8 when it is moved from the open position O to the closed position C. In one embodiment, the first and second motor is arranged to control/reduce the speed of the door 8 when it is moved from the open position O to the closed position C, this may be performed with or without the brakes.

Different connections between the drive unit and the door frame 3 are known in prior art, and will not be discussed further herein. For example, the drive unit may comprise one or more pinions (not shown) that rotates the motors when the weight of the door 8 moves the door 8. Additionally or alternatively, the drive units may further comprise a plurality of wheels (not shown) that are arranged to be rotated by the motors.

Figure 4:
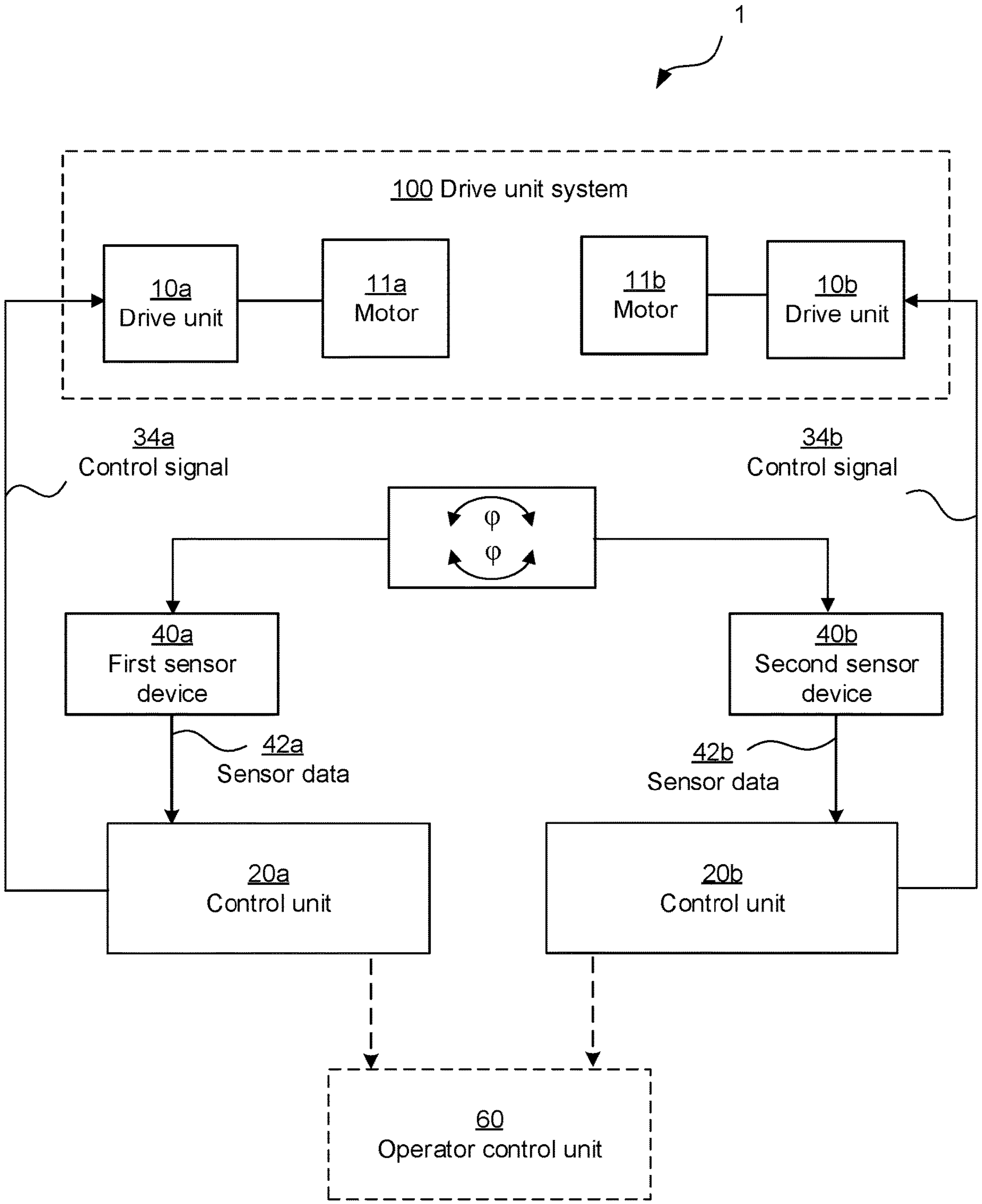
FIG. 4 is a schematic block diagram representing parts of a door operator system according to the present invention.
Figure 5:
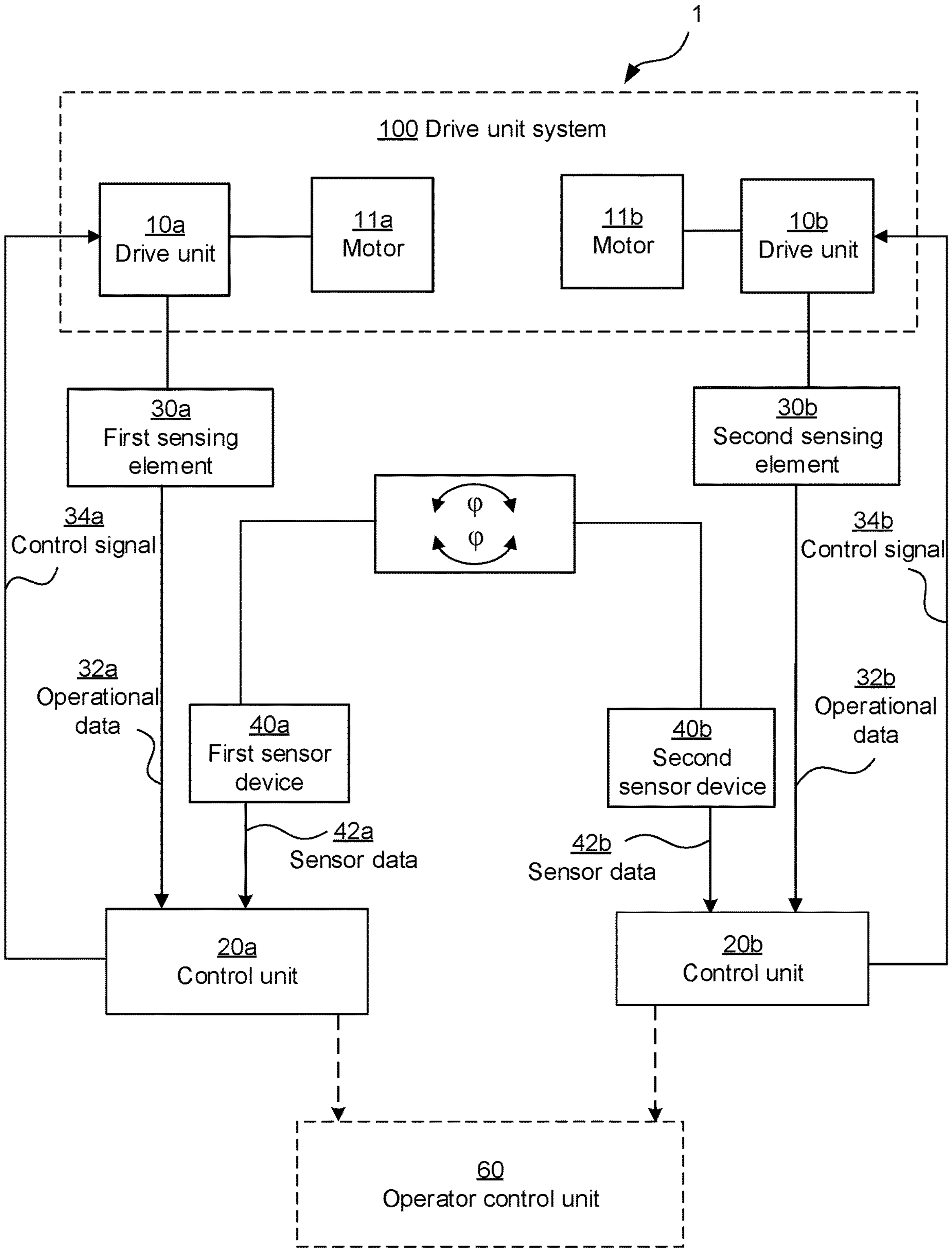
FIG. 5 is a schematic block diagram representing parts of a door operator system according to the present invention.

FIGS. 4-5 illustrate different embodiments according to some inventive aspects of the solution. The sectional door operator system 1 may perform its normal operation according to any of the embodiments provided in FIGS. 4-5.

In these embodiments shown in FIGS. 4-5, the sectional door operator system comprises a first control unit 20*a* and a second control unit 20*b*. A control unit 20 may be implemented in any known controller technology, including but not limited to microcontroller, processor (e.g. PLC, CPU, DSP), FPGA, ASIC or any other suitable digital and/or analog circuitry capable of performing the intended functionality.

The control unit 20 may further be implemented using instructions that enable hardware functionality, for example, by using computer program instructions executable in a general-purpose or special-purpose processor that may be stored on a computer-readable storage medium (disk, memory, etc.) to be executed by such a processor. The control unit 20 is configured to read instructions from a memory and execute these instructions to control the operation of the drive unit system 100. The memory of the control unit may be implemented in any known memory technology, including but not limited to ROM, RAM, SRAM, DRAM, CMOS, FLASH, DDR, SDRAM or some other memory technology. In some embodiments, the memory may be integrated with or internal to the control unit 20. The memory may store program instruction for execution by the control unit 20, as well as temporary and permanent data used by the control unit 20.

As is shown in FIGS. 4-5, the door operator system 1 further comprises a first sensor device 40*a* and a second sensor device 40*b*. It should be noted that the sensor devices 40*a-b* are present, although not shown, also in the embodiments illustrated in FIGS. 1-2. As will be described more in detail with reference to FIG. 6*a-d*, different numbers of sensor devices could be used.

Prior to presenting details of the embodiments shown in FIGS. 4-5, an exposition is provided regarding what type of deficiencies a sensor device 40 may be able to mitigate, alleviate or eliminate according to some inventive aspects of the solution.

As briefly touched upon in the background section of the invention, a door 8 of a door operator system 1 is susceptible to various types of disturbances during normal operation. Disturbances include, but are not limited to, vehicles or objects affecting the door 8 by force, vibrations generated by the door 8 while moving between positions, mechanical components being worn down, or environmental parameters such as wind load, temperature changes, etc. These disturbances may lead to components of the door operator system 1 malfunctioning. Specifically, a sectional door 8 or any interconnected section 9*a-e* of the sectional door 8 may become skewed or misaligned in relation to a true horizontal plane of the door operator system 1. In an ideal operation of the door operator system 1, the door 8 and all its interconnected sections 9*a-e* are completely horizontal to a floor level of the door operator system 1.

A deviation of an angle $\varphi$ of the door 8 or any interconnected section 9*a-e* in relation to a true horizontal plane of the door operator system 1 is ideally discovered as early as possible. Hence, a sensor device 40 may be configured to continuously monitor at least one section 9 or each individual section 9*a-e* of the door 8 and transmit the information to at least one control unit 20. Moreover, the sensor device 40 may be configured to detect wear of critical components of the door operator system 1 by applying signal analysis for observing the vibrations generated by the door 8 moving. The control unit 20 may then compare these vibrations with a normal vibration pattern of the door 8 and thus determine if any mechanical components require service or maintenance. Vibration analysis may detect problems such as for example imbalance, bearing failures, mechanical looseness, misalignment, resonance and natural frequencies, electrical motor faults or bent shafts. Examples of vibration measurements may include, but are not limited to, overall level of vibration, spectral analysis of vibration, discrete frequency monitoring, shock pulse monitoring, kurtosis measurement, signal averaging, cepstrum analysis or any combination thereof.

The door operator system 1 may in this regard also be self-learning in order to intelligently generate e.g. bearing fault diagnostics and machine health attributes. When the sensor device 40 provides the control unit 20 with sensor data 42, the control unit 20 attempts to recognize patterns by itself. The control unit 20 of the door operator system 1 thus generates autonomous decisions. Both supervised and unsupervised learning algorithms may be implemented and/or applied, such as for example regression algorithms, decision trees, K-means, K-nearest neighbours, neural networks, support vector machines or principal component analysis. An intelligent system as described may learn from continuously receiving accurate sensor readings from the sensor device 40. Bearing fault diagnostics and/or machine health attributes generated autonomously may be stored in the memory of the control unit 20 for use in controlling the drive unit system 100. This will be explained in detail when referencing FIGS. 7-8.

Returning to FIG. 4, the at least one sensor device 40*a-b* is configured to provide sensor data 42*a-b* of the door 8 to the at least one control unit 20*a-b*. In FIG. 4, two sensor devices 40*a-b* are present, which each is connected to one control unit 20*a*, 20*b*. In the following section such a configuration will be described. However, it should be noted that the below description is applicable to a situation having only one sensor device, and/or only one control unit.

The sensor devices 40*a-b* are configured to enable continuous monitoring and adjustment of alignment and horizontal levelling by continuously transmitting sensor data 42*a-b* to the control units 20*a-b*. The sensor data 42*a-b* relate to an angle $\varphi$ of the door 8 in relation to a true horizontal plane of the door operator system 1. In order to be able to accurately determine the horizontal direction of the door 8 compared to gravity, the sensor devices 40*a-b* may comprise at least one accelerometer. Alternatively or additionally, the sensor devices 40*a-b* may comprise at least one sensor or any other electrical component capable of accurately determining an angle of an object in relation to a true horizontal plane. In yet other embodiments, the sensor devices 40*a-b* may comprise a level, such as a tubular level or a bull's eye level, etc.

Figure 6A:
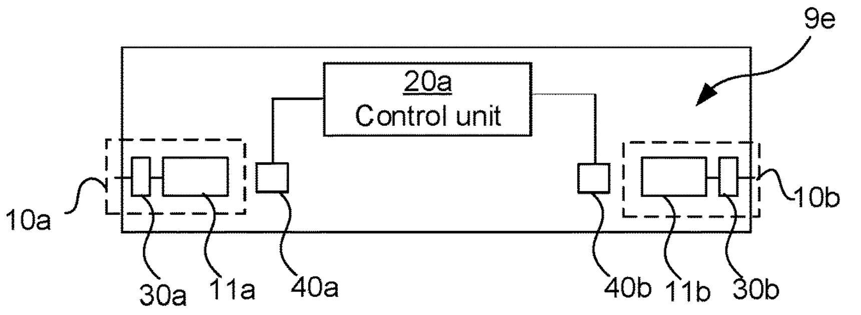
FIGS. 6*a*-*d* are schematic perspective views of different embodiments of component sets in a door operator system.

The sensor devices 40*a-b* may be arranged at different locations of the sectional door operator system as is shown in FIGS. 7*a-d*. In FIG. 6*a*, two sensor devices 40*a-b* have been arranged at a bottom section 9*e* near a respective drive unit 10*a-b*. The sensor devices 40*a-b* are configured to communicate sensor data to one control unit 20*a*.

Figure 6B:
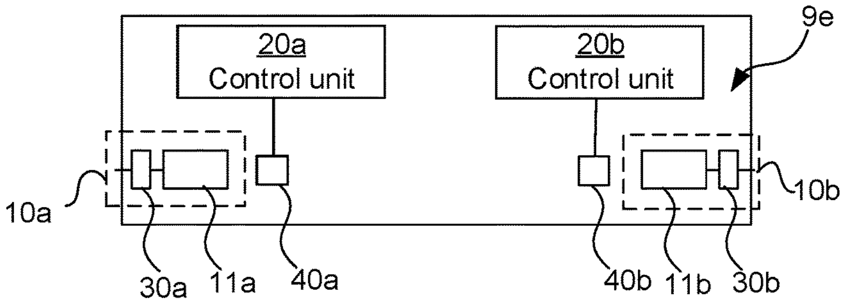

In FIG. 6*b*, two sensor devices 40*a-b* have been arranged at a bottom section 9*e* near a respective drive unit 10*a-b*. The first sensor device 40*a* is configured to communicate sensor data to a first control unit 20*a*, and the second sensor device 40*b* is configured to communicate sensor data to the second control unit 20*b*. Further, the first control unit 20*a* and the second control unit 20*b* may be configured to communicate with each other. In one embodiment, the first control unit 20*a* is configured to communicate sensor data to the second control unit 20*b*. In one embodiment, the second control unit 20*b* is configured to communicate sensor data to the first control unit 20*a*.

Figure 6C:
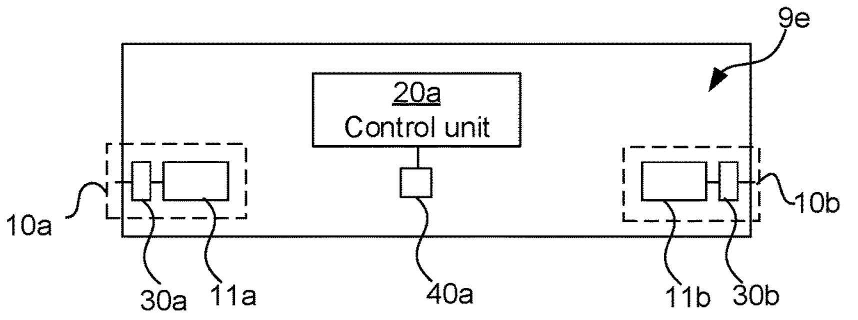

In FIG. 6*c*, one sensor device 40*a* has been arranged at a bottom section 9*e* at a location between two drive units 10*a-b*. In different embodiments, the sensor device 40*a* is arranged at different locations at the bottom section 9*e*. The sensor device 40*a* is configured to communicate sensor data to one control unit 20*a*.

Figure 6D:
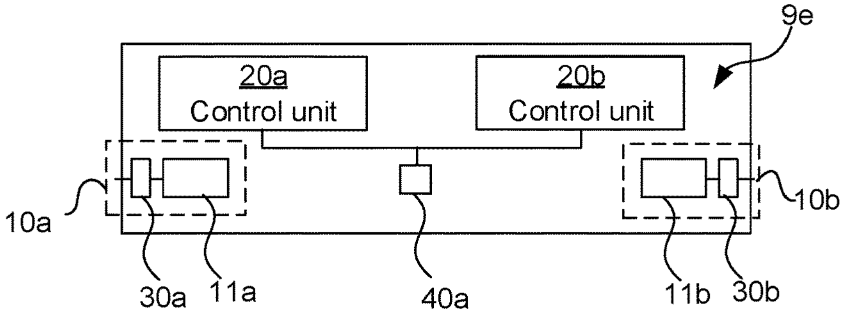

In FIG. 6*d*, one sensor device 40*a* has been arranged at a bottom section 9*e* at a location between two drive units 10*a-b*. In different embodiments, the sensor device 40*a* is arranged at different locations at the bottom section 9*e*. The sensor device 40*a* is configured to communicate sensor data to a first and a second control unit 20*a-b*. Further, the first control unit 20*a* and the second control unit 20*b* may be configured to communicate with each other. In one embodiment, the first control unit 20*a* is configured to communicate sensor data to the second control unit 20*b*. In one embodiment, the second control unit 20*b* is configured to communicate sensor data to the first control unit 20*a*.

Although not shown in FIGS. 6*a-c*, the sensor devices 40*a-b* may be arranged at any interconnected section 9*a-e* and not only the bottom section 9*e*, given that accurate sensor data 42*a-b* may be obtained and transmitted to the control units 20*a-b*. Moreover, although not shown, the control units 20*a-b* of FIGS. 6*a-d* may be arranged on any section 9*a-e*.

In the embodiments shown in FIGS. 6*a-d*, the sensor devices 40*a-b* are arranged as separate devices. If this is the case, means for communicating sensor data 42*a-b* from the sensor device to the at least one control unit 20*a-b* are provided. For instance, a communication interface configured as a transceiver may be provided. The communication interface may be based on known transceiver standards such as for instance GBIC, SFP, SFP+, QSFP, XFP, XAUI, CXP or CFP.

In alternative embodiments, the sensor devices 40*a-b* may be arranged directly on a PCB of the control units 20*a-b*. This may simplify the process of communicating sensor data 42*a-b* to the control units 20*a-b*, as internal means for communication within the control units 20*a-b* may apply.

In FIGS. 4-5, the sectional door operator system 1 may further comprise an operator control unit 60 (optional feature). The operator control unit 60 is configured to receive control data from the at least one control unit 20*a-b*. Control data may include for instance operational status, health of individual mechanical components and/or a current of a motor in the sectional door operator system 1. The at least one control unit 20*a-b* may be configured to generate a report of any bugs or errors detected by the at least one sensor device 40*a-b*, and subsequently report the findings to the operator control unit 60. For instance, if a current of a motor is above a predetermined error threshold value, this may be reported. The information relating to the current of a motor is beneficial in order to identify if the motor is exposed to a higher load than normal. This may for example be the case if something is stuck in the door operator system 1.

The report may be transmitted via a communication interface operating between the at least one control units 20*a-b* and the operator control unit 60. Moreover, the report may also be transferred by IoT-services (Internet of Things). In different embodiments of the invention, different IoT-protocols may be utilized. For instance, protocols include, but are not limited to Bluetooth, WiFi, ZigBee, MQTT IoT, CoAP, DDS, NFC, AMQP, LoRaWAN, RFID, Z-Wave, Sigfox, Thread, EnOcean, cellularly based communication protocols, or any combination thereof. The error report can for instance include a report of door misalignments and/or any operational inconsistencies.

If an error report has been generated, the operator control unit 60 may further be configured to generate an alarm if one or more limits are above a predetermined error threshold value. This alarm may be visualised by an audible signal, a visual signal, or by transmitting the information to external devices. Further, if a safety hazard has been discovered, the operator control unit 60 may respond by terminating the operation of the system 1.

The operator control unit 60 may further be configured to be controllable by an operator of the system 1. The operator control unit 60 may comprise one or more displays for visualizing information of the system 1. Further, the one or more displays may comprise touch-screen functionalities and/or one or more buttons for manual operation of the system 1. Hence, the operator control unit 60 may serve as a backup controller in case of automation errors of the system 1.

In one embodiment, the drive unit system 100 comprises one or more sensors (not shown) arranged to identify a person or object in the path of the door 8 and to interrupt or reverse the movement of the door 8 when identifying the person or object. The one or more sensors may be one or more of a pressure sensor, an IR-sensor, a camera, a radar or a presence sensor. If the one or more sensors identifies a person or an object in the path of the door 8, the sensors may send a signal to the control unit 20 that may control the door 8 and stop the movement of the door 8. The control unit 20 thereafter controls the door 8 to return to the open position O or to hold until the person or object has moved and control the door to continue to the closed position. As the door 8 moves towards the floor 23 it reaches the closed position C. In the closed position C the battery of the drive unit will be connected to the first charging unit 13 and the battery will be charged.

The control units 20*a-b* are in operative communication with the drive unit system 100. The control units 20*a-b* may be in wired communication with the two drive units 10*a-b* or be in a wireless communication. Further, the control units 20*a-b* are configured to communicate with the sensor devices 40*a-b*. As will be described more with reference to FIGS. 7-8, the control units 20*a-b* are configured to control the operation of the at least first and second motors 11*a-b*. In a preferred embodiment, the control units 20*a-b* are configured to control and adjust the operating speed of the motor 11*a-b* of its associated drive unit 10*a-b* in response to control signals 34*a-b* received from the control units 20*a-b*.

Each sensor device 40*a-b* is configured to provide sensor data 42*a-b* of the door 8 and to transmit said data to the control units 20*a-b*. This is illustrated in FIG. 4, showing that the first sensor device 40*a* transmits sensor data 42*a* of the door 8 to the first control unit 20*a*. The second sensor device 40*b* transmits sensor data 42*b* of the door 8 to the second control unit 20*b*. The control units 20*a-b* are configured to evaluate the sensor data 42*a-b* from the door, and depending on the evaluation, transmit a control signal 34*a-b* to the first drive unit 10*a* and/or the second drive unit 10*b*. In alternative embodiments, a single sensor device 40 may be configured to transmit sensor data 42 to a single control unit 20. In an alternative embodiment, a single sensor device 40 may be configured to transmit sensor data 42 to two or more control units 20. In yet another embodiment, two or more sensor devices 40 may be configured to transmit sensor data 42 to a single control unit 20.

The control units 20*a-b* are arranged to receive input regarding if the door 8 should be opened or closed. In one embodiment, the control units 20*a-b* are arranged to receive the input from one or more of a user interface, a mechanical button or a remote control of the operator control unit 60.

In a preferred embodiment, the control units 20*a-b* are configured to control and adjust the operating speed of one or all of the motors 11*a-b* in response to sensor data 42*a-b* gathered by the sensor devices 40*a-b*. The sensor data 42*a-b* are collected from both sensor devices 40*a-b*, and the motors are then individually controlled by the control units 20*a-b* based on said sensor data 42*a-b*. Hence, no master-slave relationship is required between the motors, since each motor 11*a-b* can be controlled individually. For example, the speed of the first motor may be reduced while the speed of the second motors is maintained or vice versa. It is thus possible to alter the position/speed of one of the motors to achieve the preferred situation where the motors are arranged on the same position, i.e. synchronized with each other. Hence, as shown in the embodiments in FIGS. 4-5, the first control unit 20*a* is in operative communication with the first drive unit 10*a* of the drive unit system 100. Further, the second control unit 20*b* is in operative communication with the second drive unit 10*b* of the drive unit system 100.

Although not required, notably, above described embodiment would be functional even if there is a master-slave relationship between the motors.

As is shown and will be described more in detail with reference to FIG. 5, the door operator system 1 further comprises at least two sensing elements 30*a-b*. It should be noted that the sensing elements 30*a-b* are present, although not shown, also in the embodiments illustrated in FIG. 1-3. In an embodiment where the door operator system 1 comprises a first and a second drive unit 10*a-b*, the system 1 further comprises a first and a second sensing element 30*a-b*. Each sensing element 30*a-b* is arranged in conjunction to a respective motor 11*a-b* of each drive unit 10*a-b*. The data gathered from the sensing elements 30*a-b* are used to determine the operation of the motors 11*a-b*. The sensing element may further be a part of any of the control units 20*a-b*. The control units 20*a-b* may further be in operative communication with the sensing elements 30*a-b*, the communication may either be wired or wireless. In a preferred embodiment, the control units 20*a-b* are configured to control and adjust the operating speed of one or all of the motors 11*a-b* in response to operational data 32*a-b* gathered by the sensing elements 30*a-b*.

In one embodiment the sensing element 30*a-b* is in the form of a sensor. The sensor could be a position sensor that is configured to determine position of the motor 11*a-b* and/or configured to determine position relative the ground. Additionally or alternatively, the sensor is an encoder configured to determine the position of the motor 11*a-b*. Preferably, the encoder is a rotary encoder that converts the angular position or motion of a shaft or axle in the motor to a digital output signal. The sensing element 30*a-b* could also be a part of the motor 11*a-b*. This is especially true in the case where the motors 11*a-b* are a brushless DC electric motor. In one embodiment, the sensing element 30*a-b* is an encoder measuring relative a fix scale, hence measuring an absolute movement and not the rotation of the output shaft of the motor.

Each motor 11*a-b* is associated with one sensing element 30*a-b* configured to sense operational data 32 of the motors 11*a-b* and to transmit said data to the control units 20*a-b*. This is illustrated in FIG. 5, showing that the first sensing element 30*a* transmits operational data 32*a* of the first motor 11*a* to the first control unit 20*a*. The second sensing element 30*b* transmits operational data 32*b* of the second motor 11*b* to the second control unit 20*b*. The control units 20*a-b* are configured to evaluate the operational data 32*a-b* from the first and second motor 11*a-b*, and depending on the evaluation, transmit a control signal 34*a-b* to the first motor 11*a* and/or the second motor 11*b*.

As shown in FIG. 5, the door operator system 1 further comprises a door 8 and a drive unit system 100 comprising two drive units 10*a-b* with its associated motor 11*a-b*. Furthermore, two control units 20*a-b* are operating individually, and are receiving and transmitting signals individually. The control signals 34*a-b* transmitted from the control units 20*a-b* to the drive units 10*a-b* of the drive unit system 100 are thus generated independently of each other. Hence, there is no master-slave relationship between the motors, since each motor 11*a-b* can be controlled individually. For example, the speed of the first motor may be reduced while the speed of the second motors is maintained or vice versa. It is thus possible to alter the position/speed of one of the motors to achieve the preferred situation where the motors are arranged on the same position, i.e. synchronized with each other.

In alternative embodiments, means for communicating between two or more control units 20 may be provided in the form of a communication interface.

The door operator system 1 illustrated by FIG. 5 furthermore comprises a first sensing element 30*a* and a first sensor device 40*a* configured to provide data 32*a*, 42*a* to the first control unit 20*a*. Moreover, the system 1 comprises a second sensing element 30*b* and a second sensor device 40*b* configured to provide data 32*b*, 42*b* to the second control unit 20*b*.

In the embodiments shown in FIGS. 4 and 5, each control unit 20 is implementing a method to control the operation of the drive units 10*a-b* of the drive unit system 100.

Figure 7:
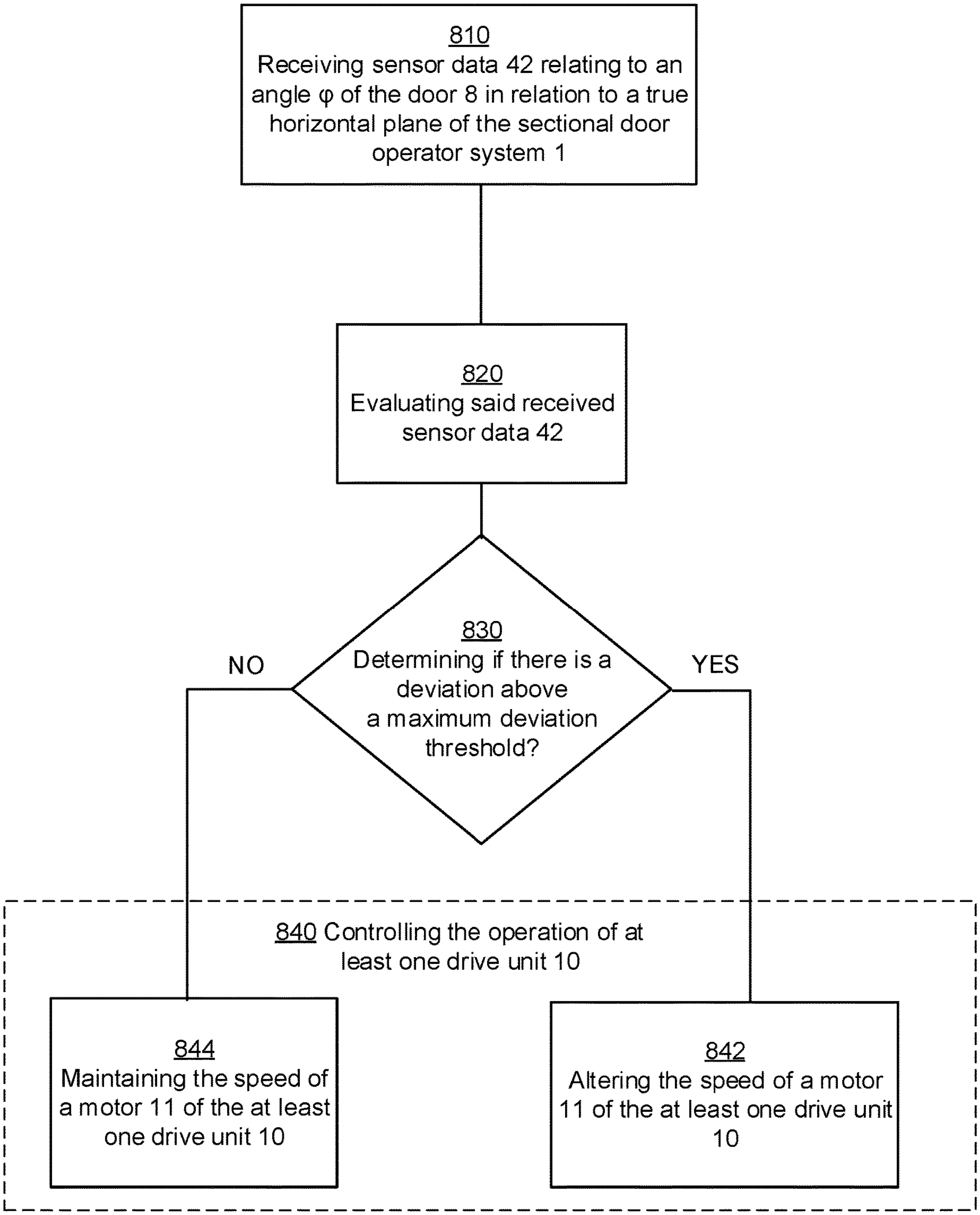
FIG. 7 is a schematic flowchart illustration representing a method of controlling a drive unit system according to the present invention.

In FIG. 7, a control unit 20 is implementing a method of the embodiment illustrated by FIG. 4. The method involves a step of receiving 810 sensor data 42 from a sensor device 40 relating to an angle φ of the door 8 in relation to a true horizontal plane of the sectional door operator system 1. The control unit 20 comprises means for receiving sensor data 42 in the form of e.g. a communication interface. For instance, the sensor data 42 have been routed from the sensor device 40 via the communication interface to the control unit 20.

Since the sensor device 40 is configured to continuously monitor the door 8, even very small deviations may be observed long before the door 8 starts malfunctioning.

Further, the method involves evaluating 820 said received sensor data 42, and determining 830 if there is a deviation between the sensor data of the door 8 and a maximum sensor threshold. The evaluation step may comprise a plurality of different evaluation methodologies. For instance, the, by the self-learning algorithms as previously explained, generated vibration patterns stored in the memory of the control unit 20 may be internally compared to a normal vibration pattern within the control unit 20. Consequently, the intelligent system may generate a recommended output. The recommended output may determine a control signal 34 based on a combination of parameters obtained from the prevailing machine learning algorithm and/or the recently received sensor data 42. The newly generated output may tune the parameters of the learning algorithm additionally, and as a consequence, improve the accuracy of any future generated control signals 34 additionally. Alternatively or additionally, the evaluation may also be based on environmental parameters or any damage to the door 8, or any combination thereof.

The step of evaluating 820 said received sensor data 42 may also include detecting misalignments of the door 8 and potentially stopping the operation of the door 8 completely. The control unit 20 may generate a report of any bugs or errors detected by the sensor device 40, and subsequently report the findings to an operator control unit 60 using technologies previously explained when referencing FIGS. 4-5.

A maximum deviation threshold may depend on characteristics of the door operator system 1. The deviation threshold may be predetermined by a user or autonomously adjusted by the learning algorithm. Generally, the door 8 or any section 9 of the door 8 will ideally be parallel to a horizontal plane of the door operator system 1, but other configurations may apply.

Based on the decision determined from the evaluated sensor data 42, the method further involves a step of controlling 840 the operation of at least one drive unit 10 of the drive unit system 100. The step of controlling 840 the operation comprises either altering 842 the speed of a motor of the at least one drive unit 10 or maintaining 844 the speed of a motor of the at least one drive unit 10. If a deviation above the deviation threshold is detected, the control unit 20 is configured to alter 842 the speed of a motor 11 of the at least one drive unit 10. Else, the control unit 20 is configured to maintain 844 the speed of the motor 11 of the at least one drive unit 10. The control unit 20 may further be configured to determine if a current of the motor of the at least one drive unit 10 is above a predetermined error threshold value. If this is the case, the control unit 20 is configured to send out an error signal through IoT-services or via a communication interface to the operator control unit 60, and to stop the at least one drive unit 10. The control unit 20 may further be configured to initiate the brakes of a motor of the at least one drive unit 10. The information relating to the current of a motor is beneficial in order to identify if the motor is exposed to a higher load than normal. This may for example be the case if something is stuck in the door operator system 1.

Figure 8:
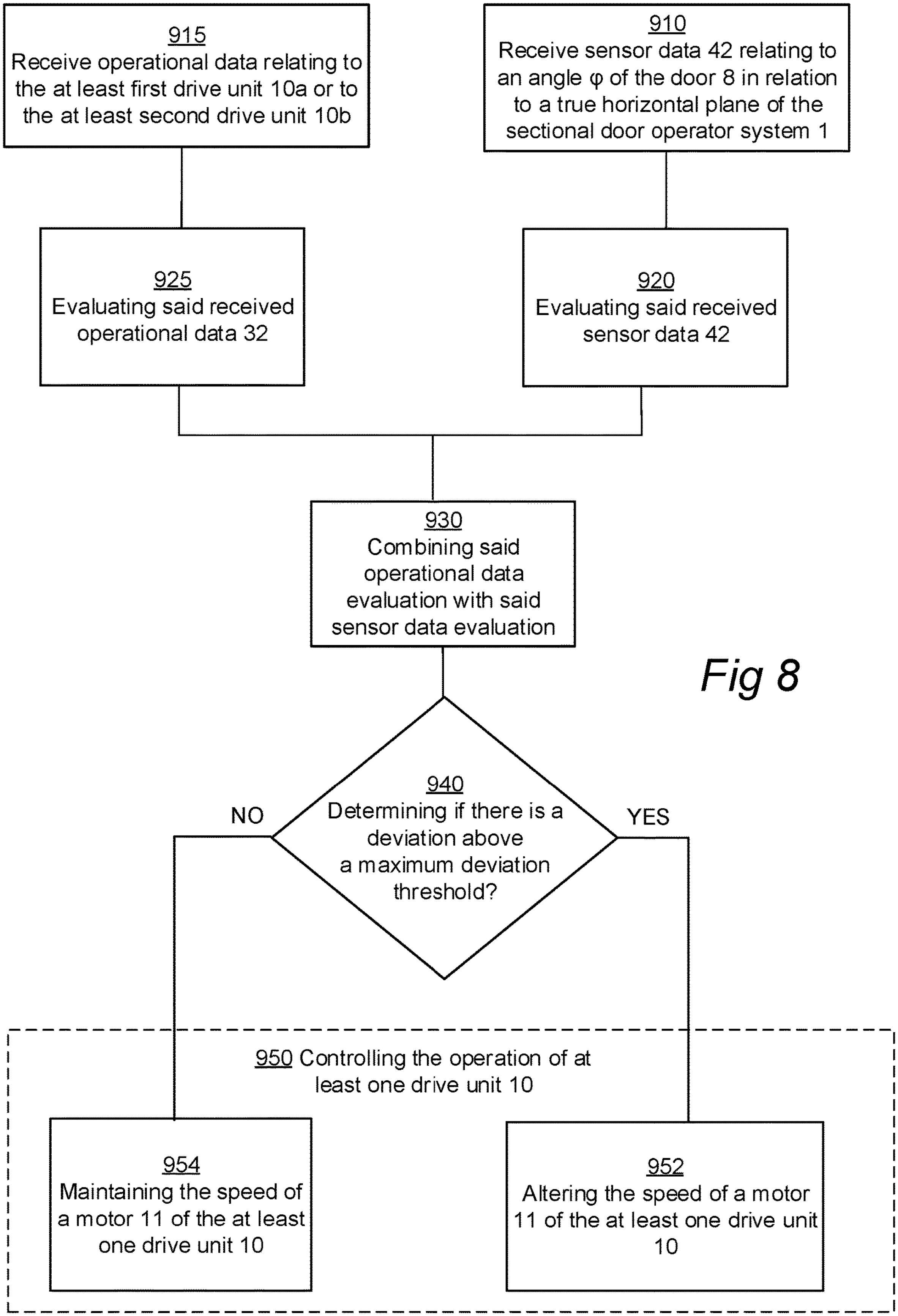
FIG. 8 is a schematic flowchart illustration representing a method of controlling a drive unit system according to the present invention.

In FIG. 8, a control unit 20 is implementing a method of the preferred embodiment illustrated by FIG. 5. Herein, the method steps are similar to those of FIG. 7 with some modifications. As the sectional door operator system 1 in this embodiment comprises sensing elements 30, additional functionalities are taken into account.

The step of receiving 910 sensor data and evaluating 920 said received sensor data is similar to the corresponding steps of FIG. 7. The embodiment illustrated by FIG. 8 further comprises steps of receiving 915 operational data 32 from sensing elements 30 relating to the at least first drive unit 10*a* or to the at least second drive unit 10*b*. Further, a step of evaluating 925 said received operational data 32 is performed.

In this step 925, a control unit 20 evaluates if there is a deviation between two motors 11*a-b* positioned on the same section 9 that is above a maximum predetermined deviation threshold. In one embodiment, if the second motor 11*b* is further away from the target position than the first motor 11*a*, the evaluation will determine if the speed of the first motor 11*a* is reduced. This allows the second motor 11*b* to catch up with the first motor 11*a* so that they are at the same position, and thus will reach the target position at the same time. In the same way, if the first motor 11*a* is further away from the target position than the second motor 11*b*, the evaluation will determine if the speed of the second motor 11*b* will be reduced. This allows the first motor 11*a* to catch up with the second motor 11*b*.

In an alternative embodiment, if the second motor 11*b* is further away from the target position than the first motor 11*a*, the evaluation will determine if the speed of the second motor 11*b* will be increased. This allows the second motor 11*b* to catch up with the first motor 11*a* so that they are at the same position, and thus will reach the target position at the same time. In the same way, if the first motor 11*a* is further away from the target position than the second motor 11*b*, the evaluation will determine if the speed of the first motor 11*b* will be increased. This allows the first motor 11*a* to catch up with the second motor 11*b*.

If it on the other hand is determined that the deviation is below the maximum deviation threshold, the evaluation will determine that the current speed of the two motors 11*a-b* is to be maintained.

The operational data may further comprise information relating to the current of the motors 11*a-b*.

The control unit 20 is further configured to determine if the actual position is equal to the target position. If it is determined that the actual position is equal to the target position, the control unit 20 will stop both the motors 11*a-b* and possibly also initiate the brakes.

The sensing elements 30*a-b* could be position sensors that are configured to determine the position of a motor 11. Additionally or alternatively, the sensing elements 30*a-b* are encoders configured to determine the position of a motor 11. Preferably, the encoder is a rotary encoder that converts the angular position or motion of a shaft or axle in the motor to a digital output signal. The sensing elements 30*a-b* could also be a part of a motor 11. This is especially true in the case where a motor 11 is a brushless DC electric motor. Hence, the operational data evaluation is related to having a synchronized vertical position of two drive units 10*a-b*, 10*c-d* or 10*e-f* in relation to each other.

In a next step, said operational data evaluation is combined 930 with said sensor data evaluation obtained from the steps of the evaluation 820 when referencing FIG. 7. The combination will result in a decision assuring that both a synchronized vertical position of two drive units 10*a-b*, 10*c-d* or 10*e-f* is provided, as well as a correct alignment of the door 8 in relation to a true horizontal plane of the door operator system 1. Finally, the steps of controlling 950 the operation of at least one drive unit 10 is similar to the controlling step 840 when referencing FIG. 7.

Figure 9:
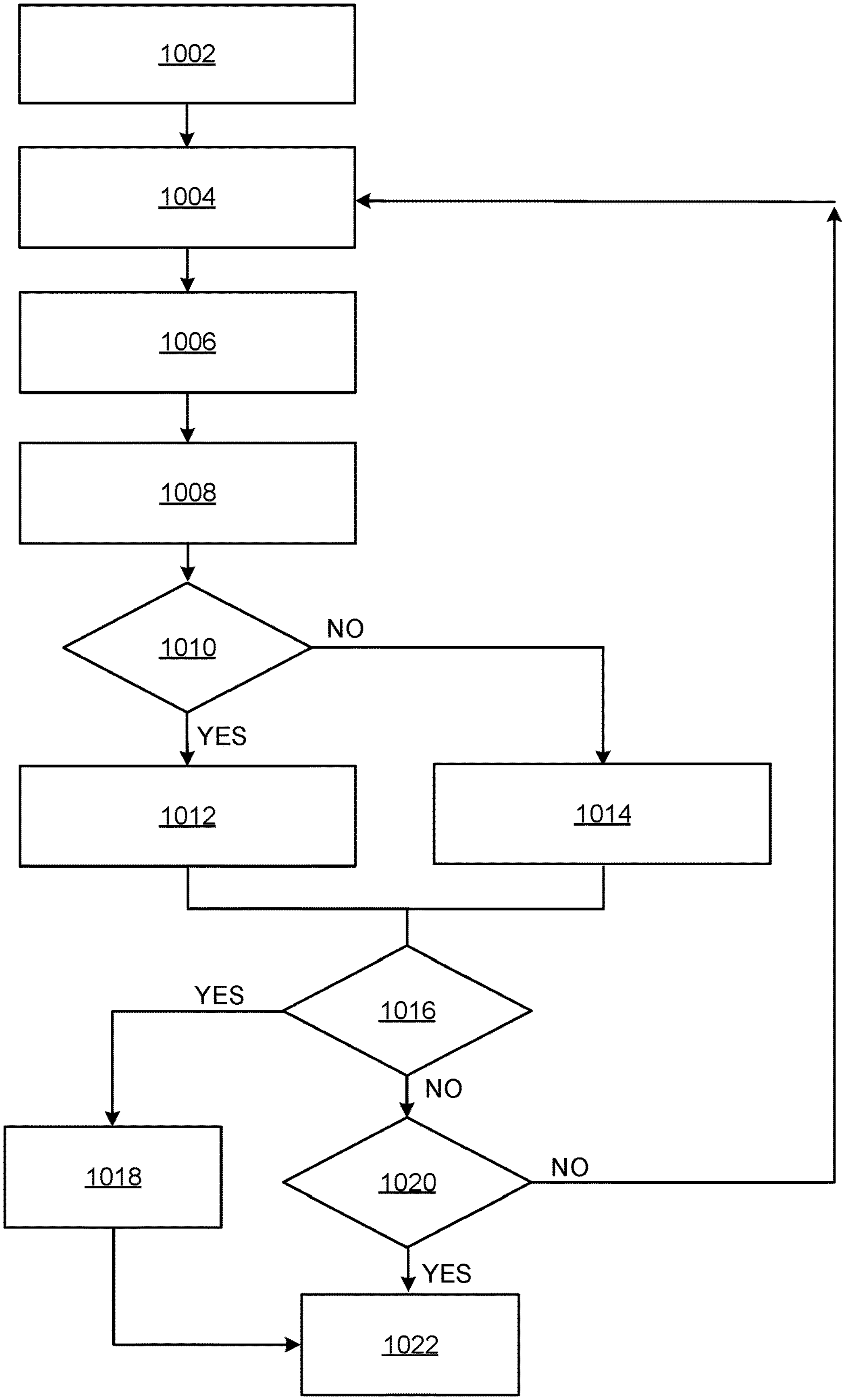
FIG. 9 is a schematic flowchart illustration representing a method of controlling a drive unit system according to the present invention.

An embodiment of the control unit 20 is described with more details with reference to FIG. 9. Herein, a detailed description is given of how two motors 11*a-b* may be synchronized in relation to each other.

In a first step 1002, the control unit 20 determines a target position of the two motors 11*a-b*. The control unit 20 continuously sets a target position and the motors 11*a-b* are individually driven to continuously achieve the target position.

In a next step 1004, the actual current position of the two motors 11*a-b* are read. The actual position is read in relation to the door travel distance. This step is preferably performed by the sensing elements 30*a-b* that receives information of the position of the motors 11*a-b*. Once the position data is received, the data is used to calculate 1006 the actual position of the door 8. This step is preferably performed by calculating the mean value of the read positions of the two motors 11*a-b*.

In a next step 1008, the deviation between the first motor 11*a* and the second motor 11*b* is calculated. If the deviation is above the predetermined threshold 1010, representing a maximum normal deviation, the speed of one of the motors needs to be altered 1014. The deviation is preferably related to a deviation in the current position of the two motors 11*a-b* and/or the deviation in the calculated actual position of the two motors 11*a-b*. Embodiments of the alteration of speed has already been described with reference to FIGS. 7 and 8. If the deviation is below the predetermined threshold 1010, the speed of the motors are not altered 1012. Hence, both motors are driven with the same speed.

Once the control unit 20 has determined if the speed of the motors 11*a-b* should be altered, a next step is to determine 1016 if a current of the first motor 11*a*, the second motor 11*b* and/or both the first motor 11*a* and the second motor 11*b* is above a predetermined error threshold value. If it is determined that the current of a motor is above the predetermined error threshold value, the control unit 20 is configured to send out an error signal to the operator control unit 60 or in some other way notify the system 1 that an error has occurred 1018. Once the system has identified the error, both motors are stopped 1022. The motors may be stopped by reducing the speed to zero and/or to initiate the brakes of the motors 11*a-b*.

If it is determined that the current of a motor is below the predetermined error threshold value, the control unit 20 is configured to determine 1020 if the actual position is equal to the target position. If it is determined that the actual position is equal to the target position, the control unit 20 will stop 1022 both the motors 11*a-b* and possibly also initiate the brakes. If it is determined that the actual position is not equal to the target position, the control unit 20 will continue back to step 1004 and read the actual position of the motors.

As previously described, a drive unit system 100 may comprise at least a first drive unit 10*a* comprising a first motor 10*a* and a second drive unit 10*b* comprising a second motor 11*b* mounted on the first section 9*e* of the door 8. The first drive unit 10*a* is moveably connected to the first frame section 4 and the second drive unit 10*b* is moveably connected to the second frame section 6. In accordance with the aforementioned, the drive unit system 100 may further comprise additional drive units 10*c-f.*

Figure 10:
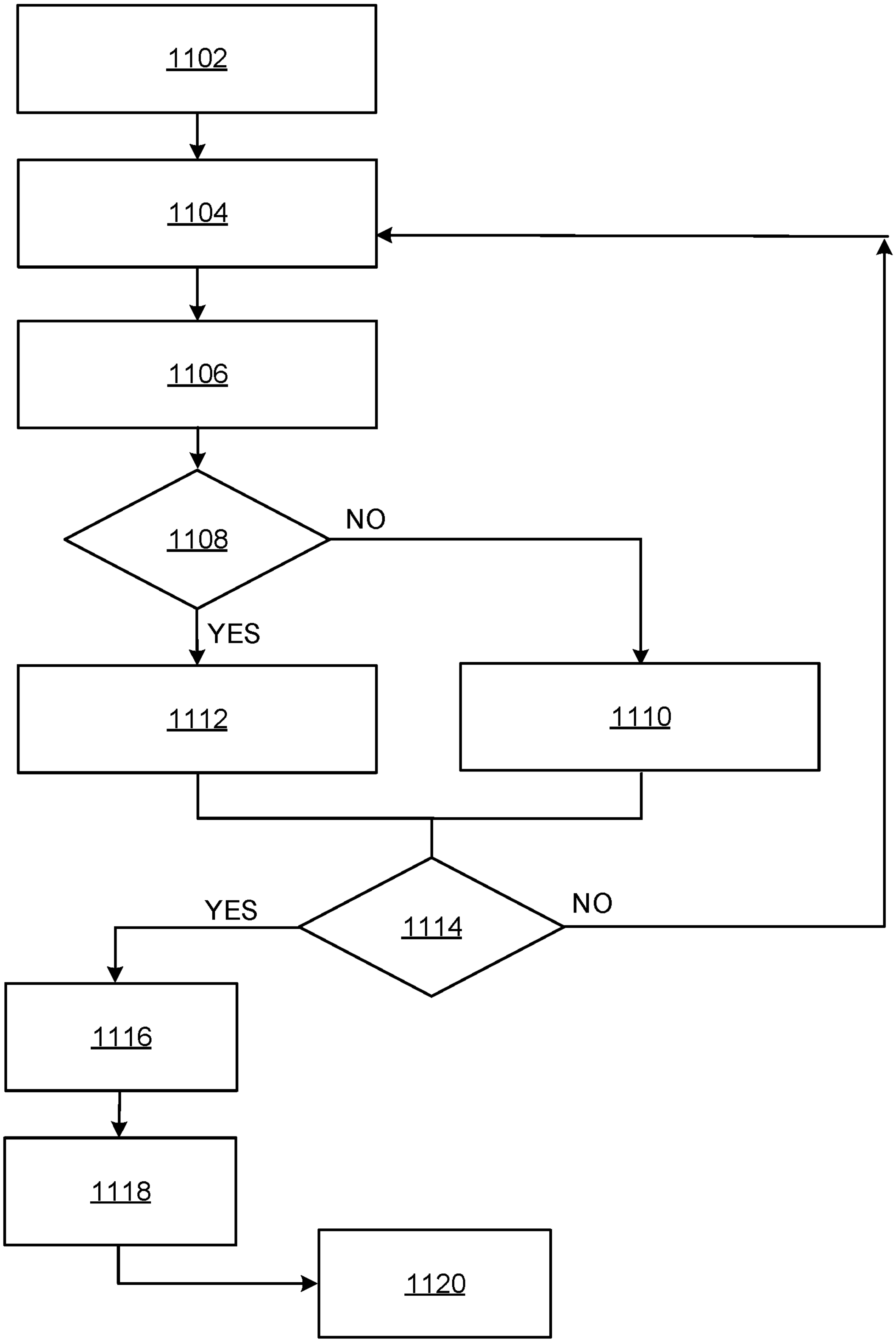
FIG. 10 is a schematic flowchart illustration representing a method of controlling a drive unit system according to the present invention.

An embodiment of the control unit 20 is described with more details with reference to FIG. 10. Herein, a detailed description is given of how the door 8 or any section 9*a-e* is horizontally maintained in relation to a true horizontal plane of the sectional door operator system 1.

In a first step 1102, the control unit 20 determines a target position corresponding to a true horizontal plane of the sectional door operator system 1. The control unit 20 continuously sets a target position and the drive units are individually driven to continuously achieve the target position.

In a next step 1104, the sensor data 42 relating to a current angle of the door 8 or any section 9*a-e* in relation to the target position is read. This step is preferably performed by the at least one sensor device 40 that receives information of a tilt angle of the door 8.

In a next step 1106, the deviation between the target position and the current angle of the door 8 or any section 9*a-e* is calculated. If the deviation is above a predetermined sensor threshold 1108, representing a maximum normal deviation, the speed of one of the motors 11 needs to be altered 1112. For instance, a master system operator or an intelligent software system may decide the predetermined sensor threshold 1108. The deviation is preferably related to a deviation of the door 8 or any section 9*a-e* in relation to a true horizontal plane of the sectional door operator system 1. If the deviation is below the predetermined sensor threshold 1110, the speed of the motors 11 are not altered. Hence, the motors 11 are driven with the same speed.

Once the control unit 20 has determined if the speed of the motors 11 should be altered, a next step is to determine 1114 if the deviation is so big that the operation of the door 8 needs to be stopped. If the deviation is above a maximum misalignment threshold 1116, the operation of the door is stopped completely 1118, and the control unit 20 may generate a report 1120 of any bugs or errors detected by any sensor device 40. The findings may be reported to a master system by transmitting it via a communication interface internal or external to the control unit 20, or via IoT-services. If the deviation is below a maximum misalignment threshold, the control unit 20 is configured to read sensor data 42 relating to a current angle of the door 1104.

In one embodiment as illustrated by FIGS. 3*a-b*, the drive unit system 100 comprises a third and a fourth drive unit 10*c-d* mounted on a second horizontal section 9 of the horizontal sections and arranged to assist the first and second drive units 10*a-b* when moving the sectional door 8 from the closed position C to the open position O. The third and fourth drive units 10*c-d* are connected to a third and fourth control unit 20*c-d* respectively, and arranged to be controlled by the control units 20*c-d* in the same way as described above in relation to the first and second drive unit 10*a-b*. In this embodiment, the door operator system 1 comprises four drive units 10*a-d*, four sensing elements 30*a-d*, at least one sensor device 40, and four control units 20*a-d*. The first and second drive unit 10*a-b* are arranged on one section 9*e* and the third and fourth drive unit 10*c-d* are arranged on another section 9*c*. Each sensing element 30*a-d* is arranged in conjunction to a respective drive unit 10*a-d*. Hence, the first and second sensing elements 30*a-b* are arranged in conjunction to the first and second drive units 10*a-b* and the third and fourth sensing elements 30*c-d* are arranged in conjunction to the third and fourth drive unit 10*c-d*. In one embodiment, the at least one sensor device 40 may be arranged at any of the plurality of horizontal or interconnected sections 9*a-e*. In another embodiment, the at least one sensor device may be mounted directly on a PCB of any of the control units 20*a-d.*

In one embodiment, the first and second drive units 10*a-b* and the first and second sensing elements 30*a-b* are arranged on a section 9*e* that is located on the section 9 of the door being closest to the floor 23 in the closed position C. However, it should be noted that the section 9*e* could for example also be the section 9*d* which is the section being arranged next to the section being closest to the floor 23 in the closed position C.

In one embodiment, the drive unit system 100 comprises a fifth and a sixth drive unit 10*e-f* mounted on a third horizontal section 9 of the horizontal sections 9 and arranged to assist the other drive units 10*e-f* when moving the sectional door 8 from the closed position C to the open position O. The fifth and sixth drive units 10*e-f* are connected to a fifth and sixth control unit 20*e-f* and arranged to be controlled by the control units 20*e-f* in the same way as described above in relation to the first and second drive unit 10*a-b*. In an embodiment, the door operator system 1 comprises six drive units 10*a-f*, six sensing elements 30*a-f*, at least one sensor device 40, and six control units 20*a-f*. The first and second drive units 10*a-b* are arranged on one section 9*e*, the third and fourth drive units 10*c-d* are arranged on another section 9*c*, and the fifth and sixth drive units 10*e-f* are arranged on another section 9*d*. Each sensing element 30*a-f* is arranged in conjunction to a respective drive unit 11*a-f*. Hence, the first and second sensing elements 30*a-b* are arranged in conjunction to the first and second drive units 10*a-b*, the third and fourth sensing elements 30*c-d* are arranged in conjunction to the third and fourth drive units 10*c-d* and the fifth and sixth sensing elements 30*e-f* are arranged in conjunction to the fifth and sixth drive units 10*e-f* In one embodiment, the at least one sensor device 40 may be arranged at any of the plurality of horizontal or interconnected sections 9*a-e*. In another embodiment, the at least one sensor device may be mounted directly on a PCB of any of the control units 20*a-f*.

In the embodiments where additional sections 9*a-e* are arranged with sensing elements 30, sensor devices 40 and drive units 10, these may be arranged on every other section, every section or at one section being arranged above the section 9*e*.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more movable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. A sectional door operator system for opening and closing an opening, comprising:

a door arranged to be moved between an open (O) and closed (C) position and comprising a plurality of horizontal and interconnected sections, a door frame comprising a first frame section at a first side of the opening and a second frame section at a second side of the opening, wherein the plurality of horizontal and interconnected sections are connected to the door frame, a drive unit system mounted on a section of the plurality of horizontal and interconnected sections, wherein the drive unit system is arranged to move the sectional door from the closed position (C) to the open position (O), wherein the drive unit system comprises at least a first drive unit comprising a first motor and at least a second drive unit comprising a second motor, and wherein the first drive unit and the second drive unit are mounted at different vertical sides of the horizontal and interconnected section and move along the respective first frame section and second frame section, at least one sensor device mounted on a section of the plurality of horizontal and interconnected sections, and at least one control unit being in operative communication with the drive unit system and configured to control the operation of the drive unit system based on sensor data from the at least one sensor device, wherein the sensor data relates to an angle (φ) of the door in relation to a true horizontal plane of the sectional door operator system and at least one first and second sensing element configured to provide operational data of the first and second motor to the at least one control unit, wherein operational data comprises information related to positions of the first or second motors along the respective first or second frame members, wherein the at least one control unit is configured to control the operation of the drive unit system by:

receiving the sensor data, evaluating the sensor data, receiving operational data relating to the first drive unit or to the second drive unit from the first or second sensing element;

evaluating the received operational data; and combining the operational data evaluation with the sensor data evaluation, and based on the combined evaluation, control the operation of the first drive unit and/or the second drive unit.

2. The sectional door operator system according to claim 1, wherein the sectional door operator system further comprises at least a first sensor device and a second sensor device, and wherein the sectional door operator system further comprises a first control unit and a second control unit, and wherein the first sensor device is configured to provide sensor data of the door to the first control unit, and the second sensor device is configured to provide sensor data of the door to the second control unit.

3. The sectional door operator system according to claim 2, wherein the first control unit is in operative communication with the first drive unit of the drive unit system, and wherein the second control unit is in operative communication with the second drive unit of the drive unit system.

4. The sectional door operator system according to claim 1, wherein the at least one sensor device comprises at least one accelerometer.

5. The sectional door operator system according to claim 1, wherein the at least one sensor device is arranged at one of the plurality of horizontal and interconnected sections.

6. The sectional door operator system according to claim 5, wherein the at least one sensor device is arranged at a bottom section of the plurality of horizontal and interconnected sections.

7. The sectional door operator system according to claim 1, wherein the at least one control unit controls the operation of the at least first drive unit or the at least second drive unit by altering the speed of the first motor or the second motor.

8. The sectional door operator system according to claim 1, wherein the at least one control unit evaluates said received sensor data by determining if there is a deviation between the sensor data of the door and a maximum sensor threshold.

9. The sectional door operator system according to claim 1, wherein if there is a deviation between the received sensor data and a maximum sensor threshold, the speed of the first motor or the second motor is altered and if there is no deviation the speed of the first motor and the second motor is maintained.

10. The sectional door operator system according to claim 1, wherein the first and second sensing elements are position sensors and/or encoders.

11. The sectional door operator system according to claim 1, wherein the first sensing element is arranged in conjunction with the first drive unit and is configured to provide operational data of the first drive unit to the at least one control unit, and wherein the second sensing element is arranged in conjunction with the second drive unit and is configured to provide operational data of the second drive unit to the at least one control unit.

12. The sectional door operator system according to claim 1, wherein if it is determined that there is the deviation in position between the first motor and the second motor along the respective first or second frame member, the at least one control unit is further configured to determine which of the motors that are the furthest away from a target position, and wherein if the second motor is determined to be further away from the target position than the first motor, the speed of the first motor will be reduced and if the first motor is determined to be further away from the target position than the second motor, the speed of the second motor will be reduced.

13. The sectional door operator system according to claim 1, wherein the at least one control unit is further configured to determine if a position of the respective motors is equal to a target position along the respective first or second frame members, and if so the at least one control unit is configured to stop the operation of both the first and the second motor.

14. The sectional door operator system according to claim 1, wherein the drive unit system further comprises a third and a fourth drive unit mounted on another section of the plurality of sections than the first and second drive unit, wherein the third and a fourth drive unit are arranged to assist the first and second drive units when moving the door from the closed position (C) to the open position (O), and wherein the third and fourth drive unit are connected to the at least one control unit, and wherein the sectional door operator system further comprises at least a third sensor device being arranged at the same section as the third and a fourth drive unit and wherein the at least one control unit is further configured to receive sensor data from the at least third sensor device.

15. A method of controlling the operation of at least the first drive unit and the second drive unit of the drive unit system in the sectional door operator system according to claim 1, wherein the method involves providing the at least one sensor device and the at least one control unit in operative communication with the drive unit system and configured to control the operation of the drive unit system at least based on sensor data from the at least one sensor device, wherein the sensor data relates to the angle (φ) of the door in relation to the true horizontal plane of the sectional door operator system.

* * * * *